United States Patent
Chou et al.

(10) Patent No.: US 11,848,606 B2
(45) Date of Patent: Dec. 19, 2023

(54) ASYMMETRIC POWER REGULATOR SYSTEM

(71) Applicant: MEDIATEK INC., Hsin-Chu (TW)

(72) Inventors: Chia-Hua Chou, Hsinchu (TW); Yen-Hsun Hsu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 45 days.

(21) Appl. No.: 17/725,561

(22) Filed: Apr. 21, 2022

(65) Prior Publication Data

US 2022/0376615 A1     Nov. 24, 2022

Related U.S. Application Data

(60) Provisional application No. 63/189,724, filed on May 18, 2021.

(51) Int. Cl.
    *H02M 1/00*     (2006.01)
    *H02M 3/158*     (2006.01)
    *H02M 3/04*     (2006.01)

(52) U.S. Cl.
    CPC ............ *H02M 3/04* (2013.01); *H02M 1/007* (2021.05); *H02M 3/1584* (2013.01)

(58) Field of Classification Search
    CPC ....... H02M 1/007; H02M 3/04; H02M 3/1584
    See application file for complete search history.

(56) References Cited

U.S. PATENT DOCUMENTS

| | | | |
|---|---|---|---|
| 2009/0206804 A1* | 8/2009 | Xu | H02M 3/1584 323/234 |
| 2014/0184177 A1* | 7/2014 | Tournatory | H02J 3/00 323/234 |
| 2015/0028832 A1 | 1/2015 | Tournatory | |

(Continued)

FOREIGN PATENT DOCUMENTS

| CN | 107851993 A | 3/2018 |
|---|---|---|
| CN | 111726000 A | 9/2020 |

(Continued)

OTHER PUBLICATIONS

Muhammad Abrar Akram et al., Power Delivery Networks for Embedded Mobile SoCs: Architectural Advancements and Design Challenges, IEEE Access, vol. 9, Mar. 22, 2021, pp. 46573-46588. XP011847283, Mar. 22, 2021.

(Continued)

*Primary Examiner* — Jue Zhang
(74) *Attorney, Agent, or Firm* — Winston Hsu

(57) ABSTRACT

The present invention provides a device including a first power delivery channel and a second power delivery channel. The first power delivery channel includes a first voltage regulator, wherein the first voltage regulator is configured to receive a first input voltage to generate a first output signal. The second power delivery channel includes a second voltage regulator and a third voltage regulator, wherein the second voltage regulator receives a second input voltage to generate a second output signal, and the third voltage regulator receives the second output signal to generate a converted second output signal, wherein the first output signal and the converted second output signal are coupled together to a core circuit.

12 Claims, 3 Drawing Sheets

(56) References Cited

U.S. PATENT DOCUMENTS

2018/0013348 A1    1/2018    Paul

FOREIGN PATENT DOCUMENTS

| TW | 201421210 A | 6/2014 |
| TW | 202109228 A | 3/2021 |

OTHER PUBLICATIONS

Edward A. Burton et al., FIVR-Fully Integrated Voltage Regulators on 4th Generation Intel Core SoCs, 2014 IEEE, pp. 432-439, XP032589773, Mar. 16, 2014.

Nasser Kurd, "Haswell: A Family of IA 22nm Processors", 2014 IEEE International Solid-State Circuits Conference.

Christopher Schaef, "A Fully Integrated Voltage Regulator in 14nm CMOS with Package-Embedded Air-Core Inductor Featuring Self-Trimmed, Digitally Controlled Variable On-Time Discontinuous Conduction Mode Operation", 2019 IEEE International Solid-State Circuits Conference.

* cited by examiner

ASYMMETRIC POWER REGULATOR SYSTEM

CROSS REFERENCE TO RELATED APPLICATIONS

This application claims the benefit of U.S. Provisional Application No. 63/189,724, filed on May 18, 2021. The content of the application is incorporated herein by reference.

BACKGROUND

In order to have faster response and smaller power loss, a two-step power delivery network (PDN) having a buck converter outside a system on chip (SoC) and an integrated voltage regulator is developed. However, due to the low L/C (inductance/capacitance) value of the integrated voltage regulator (IVR), its light load efficiency is usually lower.

SUMMARY

It is therefore an objective of the present invention to provide a power delivery system having two-step PDN, which has better light-load power efficiency, to solve the above-mentioned problems.

According to one embodiment of the present invention, a device comprising a first power delivery channel and a second power delivery channel. The first power delivery channel comprises a first voltage regulator, wherein the first voltage regulator is configured to receive a first input voltage to generate a first output signal. The second power delivery channel comprises a second voltage regulator and a third voltage regulator, wherein the second voltage regulator receives a second input voltage to generate a second output signal, and the third voltage regulator receives the second output signal to generate a converted second output signal, wherein the first output signal and the converted second output signal are coupled together to a core circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
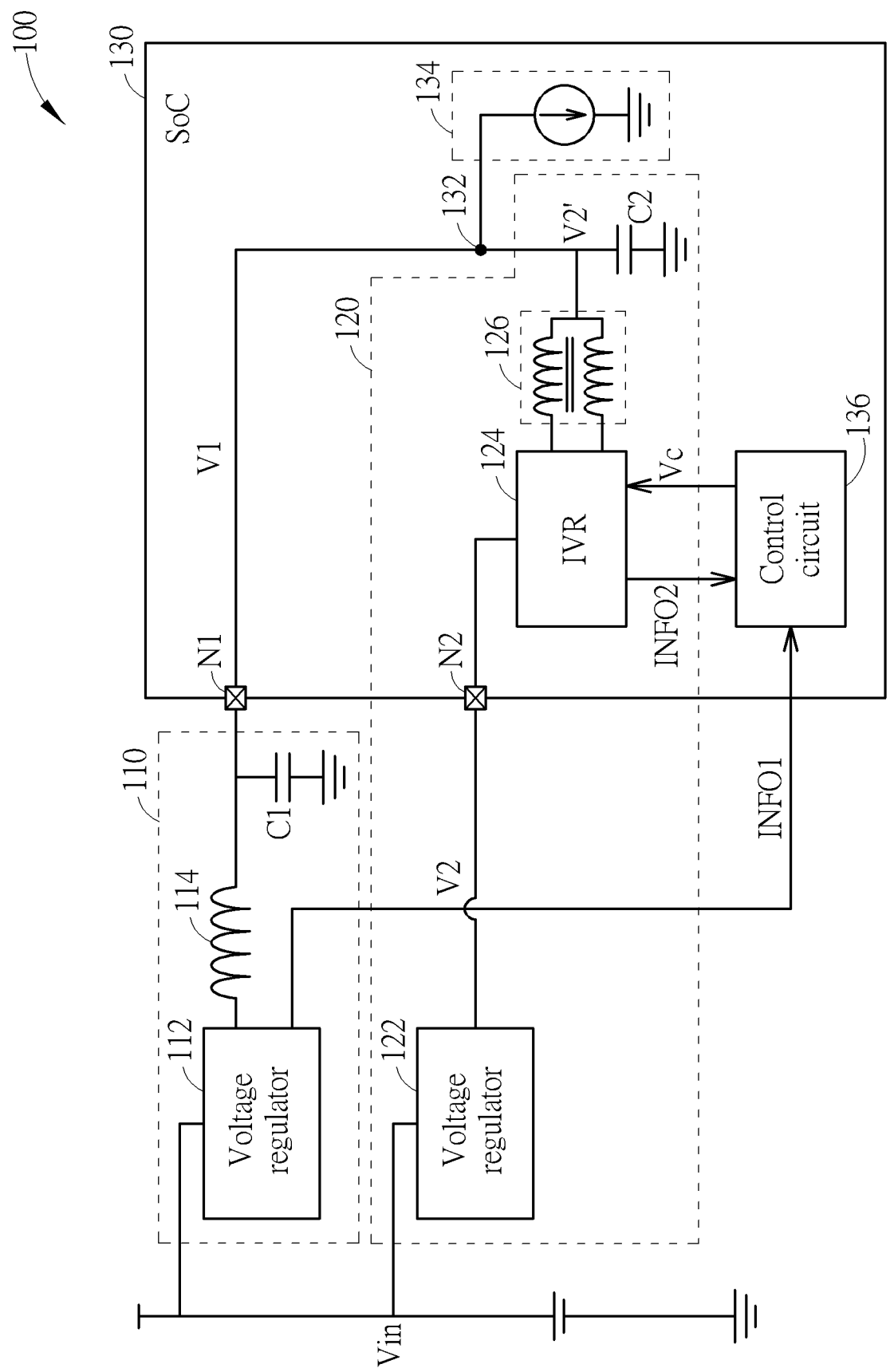
FIG. 1 is a diagram illustrating a device according to a first embodiment of the present invention.

FIG. 1 is a diagram illustrating a device 100 according to one embodiment of the present invention. As shown in FIG. 1, the device 100 comprises a first power delivery channel 110, a second power delivery channel 120 and a SoC 130. The first power delivery channel 110 comprises a voltage regulator 112 with an inductor 114 and a capacitor C1, wherein a first node of the inductor 114 is coupled to an output terminal of the voltage regulator 112, the capacitor C1 is coupled between a second node of the inductor 114 and a ground voltage, and all of the voltage regulator 112 with the inductor 114 and the capacitor C1 are located outside the SoC 130. The second power delivery channel 120 comprises a voltage regulator 122, an integrated voltage regulator (IVR) 124 with a coupled inductor 126 and a capacitor C2, wherein the voltage regulator 122 is located outside the SoC 130, and the IVR 124 with the coupled inductor 126 and the capacitor C2 are within the SoC 130. In addition, the SoC 130 comprises a first pad N1, a second pad N2, a terminal 132, a core circuit 134 and a control circuit 136. In this embodiment, the inductance of the inductor 114 is greater than the inductance of the coupled inductor 126.

In one embodiment, the voltage regulator 112 with the inductor 114 can be replaced by a switched-capacitor regulator.

In this embodiment, both the first power delivery channel 110 and the second power delivery channel 120 are used to provide voltage and current to the core circuit 134, that is the first power delivery channel 110 and the second power delivery channel 120 can be regarded as an asymmetrical power delivery system comprising a one-step PDN and a two-step PDN. Specifically, the first power delivery channel 110 is the one-step PDN, and the voltage regular 112 with the inductor 114 serves as a buck converter to step down an input voltage Vin to generate a first output voltage V1, wherein the input voltage Vin is a DC voltage that is generated according to a battery, the first output voltage V1 is inputted into the SoC 130 via the pad N1 In this embodiment, without a limitation of the present invention, the input voltage Vin may be 5V, and the first output voltage V1 may be 1V. The second power delivery channel 120 is the two-step PDN, and the voltage regular 122 serves as a buck converter to step down the input voltage Vin to generate a second output voltage V2, wherein the input voltage Vin is a DC voltage that is generated according to a battery, the second output voltage V2 is inputted into the SoC 130 via the pad N2. Then, the IVR 124 with the coupled inductor 126 steps down the second output voltage V2 to generate a converted second output voltage V2'. In this embodiment, without a limitation of the present invention, the second output voltage V2 may be 1.8V or 1.5V, and the converted second output voltage V2' may be 1V.

Each of the first power delivery channel 110 and the second power delivery channel 120 is used to generate a stable DC voltage, and the first output voltage V1 outputted by the first power delivery channel 110 and the converted second output voltage V2' outputted by the second power delivery network 120 ideally have the same voltage level such as 1V.

In the device 100 shown in FIG. 1, because of the two-step PDN implemented by the second power delivery channel 120, the converted second output voltage V2' and the supply voltage of the core circuit 134 can have faster dynamic voltage and frequency scaling (DVFS) control and smaller power loss when the SoC 130 operates in a normal case. However, as described in the prior art, the two-step PDN has worse light-load power efficiency. Therefore, the first power delivery channel 110 and the control circuit 136 are designed to improve the light-load power efficiency of the SoC 130. Specifically, the control circuit 136 can receive information INFO1 of the voltage regulator 112 in the first power delivery channel 110 and information INFO2 of the IVR 124 in the second power delivery channel 120 to determine whether the core circuit 134 is in a light-load state. In detail, the information INFO1 of the voltage regulator 112 is the amount of current flowing from the voltage regulator 112, the information INFO2 of the IVR 124 is the amount of current flowing from the IVR 124, and the control circuit 136 determines whether the core circuit 134 is in the light-load state according to a summation of the amount of current flowing from the voltage regulator 112 and the amount of current flowing from the IVR 224. For example, the control circuit 136 can determine that the core circuit 134 is in the light-load state when the summation is less than a threshold, or the control circuit 136 can determine that the core circuit 134 is in the light-load state when the summation is within a specific range. It is noted that, the above-mentioned light-load state determination is for illustrative, not a limitation of the present invention. In other embodiments, the control circuit 136 can obtain the information of the core circuit 134 from other components to determine if the core circuit 134 is in the light-load state.

Then, if it is determined that the core circuit 134 is in the light-load state, the control circuit 136 generates a control signal Vc to prevent IVR 124 from providing current; and if the core circuit 134 is not in the light-load state, the IVR 124 is still enabled to provide current to the core circuit 134. Therefore, since only the first power delivery channel 110 belonging to one-step PDN is used to provide the supply voltage when the core circuit 134 is in the light-load state, the device 100 will have good light-load power efficiency. In addition, when the control circuit 136 determines that the core circuit 134 is from the light-load state to a normal-load state or a heavy-load state, the control circuit 136 can immediately generate the control signal Vc to enable the IVR 124 to provide current to the core circuit 134.

In light of above, the device 100 can have the advantages of the two-step PDN, and the SoC 130 of the device 100 also has good light-load power efficiency.

It is noted that, in the above embodiment shown in FIG. 1, the control signal Vc generated by the control circuit 136 is used to enable or disable the IVR 124, but it's not a limitation of the present invention. In other embodiments, the control signal Vc generated by the control circuit 136 can be used to disable the second power delivery channel 120 by disabling the other components within the second power delivery channel 120. In addition, in other embodiments, the control circuit 136 may be integrated into the IVR 124, or the control circuit 136 can be positioned outside the SoC 130.

Figure 2:
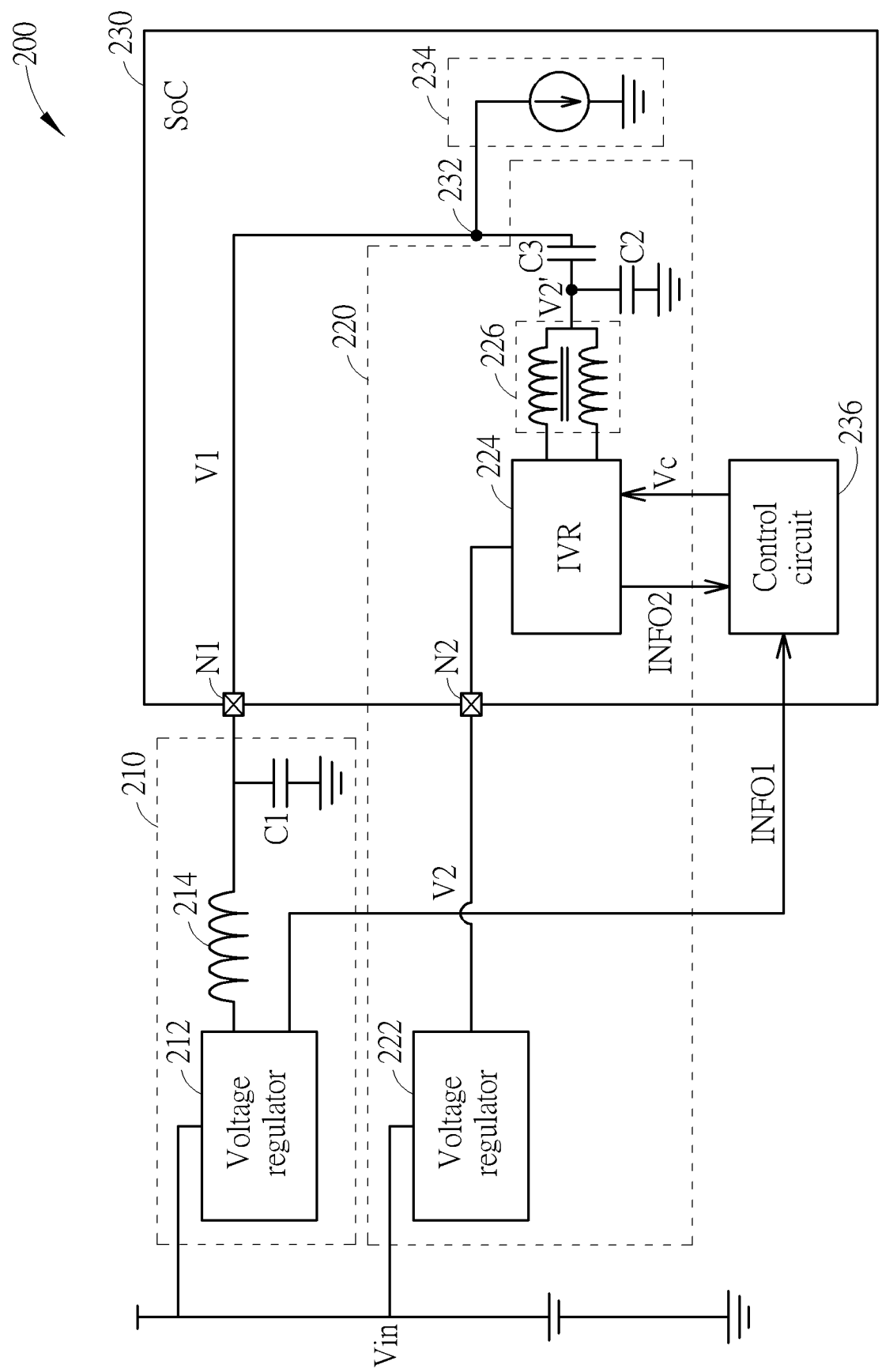
FIG. 2 is a diagram illustrating a device according to a second embodiment of the present invention.

FIG. 2 is a diagram illustrating a device 200 according to one embodiment of the present invention. As shown in FIG. 2, the device 200 comprises a first power delivery channel 210, a second power delivery channel 220 and a SoC 230. The first power delivery channel 220 comprises a voltage regulator 212 with an inductor 214 and a capacitor C1, wherein a first node of the inductor 214 is coupled to an output terminal of the voltage regulator 212, the capacitor C1 is coupled between a second node of the inductor 214 and a ground voltage, and all of the voltage regulator 212 with the inductor 214 and the capacitor C1 are located outside the SoC 230. The second power delivery channel 220 comprises a voltage regulator 222, an IVR 224 with a coupled inductor 226, a capacitor C2 and a capacitor C3, wherein a first node of the capacitor C3 is coupled to an output terminal of the IVR 224 with the coupled inductor 226, the capacitor C2 is coupled between the first node of the capacitor C3 and the ground voltage, the voltage regulator 222 is located outside the SoC 230, and the IVR 224 with the coupled inductor 226 and the capacitor C2 are within the SoC 230. In addition, the SoC 230 comprises a first pad N1, a second pad N2, a terminal 232, a core circuit 234 and a control circuit 236. In this embodiment, the inductance of the inductor 214 is greater than the inductance of the coupled inductor 226.

In this embodiment, both the first power delivery channel 210 and the second power delivery channel 220 are used to provide voltage and current to the core circuit 234, that is the first power delivery channel 210 and the second power delivery channel 220 can be regarded as an asymmetrical power delivery system comprising a one-step PDN and a two-step PDN. Specifically, the first power delivery channel 210 is the one-step PDN, and the voltage regular 212 with the inductor 214 serves as a buck converter to step down an input voltage Vin to generate a first output voltage V1, wherein the input voltage Vin is a DC voltage that is generated according to a battery, the first output voltage V1 is inputted into the SoC 230 via the pad N1. In this embodiment, without a limitation of the present invention, the input voltage Vin may be 5V, and the first output voltage V1 may be 1V. The second power delivery channel 220 is the two-step PDN, and the voltage regular 222 serves as a buck converter to step down the input voltage Vin to generate a second output voltage V2, wherein the input voltage Vin is a DC voltage that is generated according to a battery, the second output voltage V2 is inputted into the SoC 230 via the pad N2. Then, the IVR 224 with the coupled inductor 226 steps down the second output voltage V2 to generate a converted second output voltage V2'. In this embodiment, without a limitation of the present invention, the second output voltage V2 may be 1.8V or 1.5V, and the converted second output voltage V2' may be 1V.

Each of the first power delivery channel 210 and the second power delivery channel 220 is used to generate a stable DC voltage, and the first output voltage V1 outputted by the first power delivery channel 210 and the converted second output voltage V2' outputted by the second power delivery network 220 ideally have the same voltage level such as 1V.

In this embodiment, the first power delivery channel 210 is used to provide DC current to the terminal 232, and the second power delivery channel 220 is used to provide AC current to the terminal 232 due to the capacitor C3.

In the device 200 shown in FIG. 2, because of the two-step PDN implemented by the second power delivery channel 220, the converted second output voltage V2' and the supply voltage of the core circuit 234 can have faster DVFS control and smaller power loss when the SoC 230 operates in a normal case. However, as described in the prior art, the two-step PDN has worse light-load power efficiency. Therefore, the first power delivery channel 210 and the control circuit 236 are designed to improve the light-load power efficiency of the SoC 230. Specifically, the control circuit 236 can receive information INFO1 of the voltage regulator 212 in the first power delivery channel 210 and information INFO2 of the IVR 224 in the second power delivery channel 220 to determine whether the core circuit 234 is in a light-load state. In detail, the information INFO1 of the voltage regulator 212 is the amount of current flowing from the voltage regulator 212, the information INFO2 of the IVR 224 is the amount of current flowing from the IVR 224, and the control circuit 236 determines whether the core circuit 234 is in the light-load state according to a summation of the amount of current flowing from the voltage regulator 212 and the amount of current flowing from the IVR 224. For example, the control circuit 136 can determine that the core circuit 234 is in the light-load state when the summation is less than a threshold, or the control circuit 236 can determine that the core circuit 234 is in the light-load state when the summation is within a specific range.

Then, if it is determined that the core circuit 234 is in the light-load state, the control circuit 236 generates a control signal Vc to prevent IVR 224 from providing current; and if the core circuit 234 is not in the light-load state, the IVR 224 is enabled to provide current to core circuit 234. Therefore, since only the first power delivery channel 210 belonging to on-step PDN is used to provide the supply voltage when the core circuit 234 is in the light-load state, the device 200 will have good light-load power efficiency. In addition, when the control circuit 236 determines that the core circuit 234 is from the light-load state to a normal-load state or a heavy-load state, the control circuit 236 can immediately generate the control signal Vc to enable the IVR 224 to provide current to the core circuit 234.

It is noted that, in the above embodiment shown in FIG. 2, the control signal Vc generated by the control circuit 236 is used to enable or disable the IVR 224, but it's not a limitation of the present invention. In other embodiments, the control signal Vc generated by the control circuit 236 can be used to disable the second power delivery channel 220 by disabling the other components within the second power delivery channel 220. In addition, in other embodiments, the control circuit 236 may be integrated into the IVR 224, or the control circuit 236 can be positioned outside the SoC 230.

Figure 3:
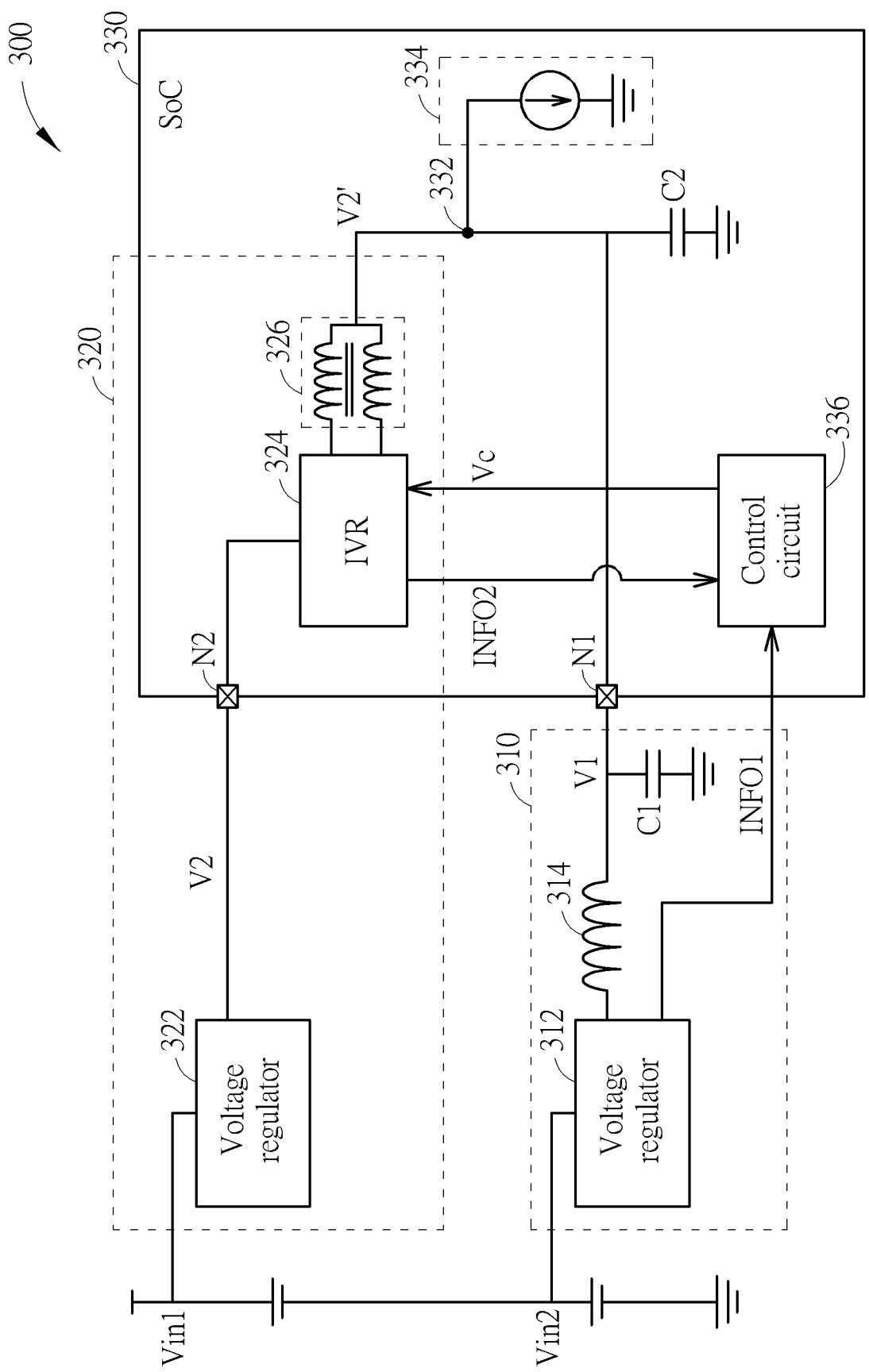
FIG. 3 is a diagram illustrating a device according to a third embodiment of the present invention.

FIG. 3 is a diagram illustrating a device 300 according to one embodiment of the present invention. As shown in FIG. 3, the device 300 comprises a first power delivery channel 310, a second power delivery channel 320 and a SoC 330. The first power delivery channel 310 comprises a voltage regulator 312 with an inductor 314 and a capacitor C1, wherein a first node of the inductor 314 is coupled to an output terminal of the voltage regulator 312, the capacitor C1 is coupled between a second node of the inductor 314 and a ground voltage, and all of the voltage regulator 312 with the inductor 314 and the capacitor C1 are located outside the SoC 330. The second power delivery channel 320 comprises a voltage regulator 322, an IVR 324 with a coupled inductor 326, wherein the voltage regulator 322 is located outside the SoC 330, and the IVR 324 with the coupled inductor 326 are within the SoC 330. In addition, the SoC 330 comprises a first pad N1, a second pad N2, a capacitor C2, a terminal 332, a core circuit 334 and a control circuit 336. In this embodiment, the inductance of the inductor 314 is greater than the inductance of the coupled inductor 326.

In this embodiment, both the first power delivery channel 310 and the second power delivery channel 320 are used to provide voltage and current to the core circuit 334, that is the first power delivery channel 310 and the second power delivery channel 320 can be regarded as an asymmetrical power delivery system comprising a one-step PDN and a two-step PDN. Specifically, the first power delivery channel 310 is the one-step PDN, and the voltage regular 312 with the inductor 314 serves as a buck converter to step down an input voltage Vin2 to generate a first output voltage V1, wherein the input voltage Vin2 is a DC voltage that is generated according to a battery, the first output voltage V1 is inputted into the SoC 330 via the pad N1. In this embodiment, without a limitation of the present invention, the input voltage Vin2 may be 5V, and the first output voltage V1 may be 1V. The second power delivery channel 320 is the two-step PDN, and the voltage regular 322 serves as a buck converter to step down the input voltage Vin1 to generate a second output voltage V2, wherein the input voltage Vin2 is a DC voltage that is generated according to two or more batteries, the second output voltage V2 is inputted into the SoC 330 via the pad N2. Then, the IVR 324 with the coupled inductor 326 steps down the second output voltage V2 to generate a converted second output voltage V2'. In this embodiment, without a limitation of the present invention, the input voltage Vin1 may be 10V, the second output voltage V2 may be 1.8V or 1.5V, and the converted second output voltage V2' may be 1V.

In this embodiment, the device 300 has two or more batteries, and the first power delivery channel 310 receives the input voltage Vin2 with lower level, and the second power delivery channel 320 receives the input voltage Vin1 with higher level. This arrangement can make the circuit design easier.

Each of the first power delivery channel 310 and the second power delivery channel 320 is used to generate a stable DC voltage, and the first output voltage V1 outputted by the first power delivery channel 310 and the converted second output voltage V2' outputted by the second power delivery network 320 ideally have the same voltage level such as 1V.

In the device 300 shown in FIG. 3, because of the two-step PDN implemented by the second power delivery channel 320, the converted second output voltage V2' and the supply voltage of the core circuit 334 can have faster DVFS control and smaller power loss when the SoC 330 operates in a normal case. However, as described in the prior art, the two-step PDN has worse light-load power efficiency. Therefore, the first power delivery channel 310 and the control circuit 336 are designed to improve the light-load power efficiency of the SoC 330. Specifically, the control circuit 336 can receive information INFO1 of the voltage regulator 312 in the first power delivery channel 310 and information INFO2 of the IVR 324 in the second power delivery channel 320 to determine whether the core circuit 334 is in a light-load state. In detail, the information INFO1 of the voltage regulator 312 is the amount of current flowing from the voltage regulator 312, the information INFO2 of the IVR 324 is the amount of current flowing from the IVR 324, and the control circuit 336 determines whether the core circuit 334 is in the light-load state according to a summation of the amount of current flowing from the voltage regulator 312 and the amount of current flowing from the IVR 324. For example, the control circuit 136 can determine that the core circuit 334 is in the light-load state when the summation is less than a threshold, or the control circuit 336 can determine that the core circuit 334 is in the light-load state when the summation is within a specific range.

Then, if it is determined that the core circuit 334 is in the light-load state, the control circuit 336 generates a control signal Vc to prevent IVR 324 from providing current; and if the core circuit 334 is not in the light-load state, the IVR 324 is enabled to provide current to the core circuit 334. Therefore, since only the first power delivery channel 310 belonging to one-step PDN is used to provide the supply voltage when the core circuit 334 is in the light-load state, the device 300 will have good light-load power efficiency. In addition, when the control circuit 336 determines that the core circuit 334 is from the light-load state to a normal-load state or a heavy-load state, the control circuit 336 can immediately generate the control signal Vc to enable the IVR 324 to provide current to the core circuit 334.

It is noted that, in the above embodiment shown in FIG. 3, the control signal Vc generated by the control circuit 336 is used to enable or disable the IVR 324, but it's not a limitation of the present invention. In other embodiments, the control signal Vc generated by the control circuit 336 can be used to disable the second power delivery channel 320 by disabling the other components within the second power delivery channel 320. In addition, in other embodiments, the control circuit 336 may be integrated into the IVR 324, or the control circuit 336 can be positioned outside the SoC 330.

Briefly summarized, in the embodiments of the present invention, by designing a first power delivery channel having one-step PDN and a second power delivery channel having two-step PDN for generating a supply voltage to the core circuits of SoC, and the second power delivery channel can be disabled when the core circuit operates in a light-load state, the system can have the advantages of the two-step PDN, and the light-load power efficiency will not be worsened.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device, comprising:
a first power delivery channel comprising a first voltage regulator, wherein the first voltage regulator is configured to receive a first input voltage to generate a first output signal;
a second power delivery channel comprising a second voltage regulator and a third voltage regulator, wherein the second voltage regulator receives a second input voltage to generate a second output signal, and the third voltage regulator receives the second output signal to generate a converted second output signal;
wherein the first output signal and the converted second output signal are coupled together to a core circuit.

2. The device of claim 1, wherein the device comprises a system on chip (SoC), the first voltage regulator of the first power delivery channel and the second voltage regulator of the second power delivery channel are positioned outside the SoC, and the third voltage regulator is an integrated voltage regulator positioned within the SoC.

3. The device of claim 1, further comprising:
a control circuit, configured to determine whether the core circuit is in a specific state to generate a control signal to enable or disable the second power delivery channel.

4. The device of claim 3, wherein the specific state is a light-load state, and the control circuit receives information of the first voltage regulator and information of third voltage regulator to determine whether the core circuit is in the light-load state.

5. The device of claim 4, wherein the information of the first voltage regulator is an amount of current outputting from the first voltage regulator, the information of the third voltage regulator is an amount of current outputting from the third voltage regulator, and the control circuit determines whether the core circuit is in the light-load state according to a summation of the amount of current flowing from the first voltage regulator and the amount of current flowing from the third voltage regulator.

6. The device of claim 3, wherein in response to the core circuit being in the specific state, the control circuit generates the control signal to prevent the second power delivery channel from providing current.

7. The device of claim 6, wherein in response to the core circuit being in the specific state, the control circuit generates the control signal to prevent the third voltage regulator from providing current.

8. The device of claim 1, wherein the first voltage regulator is with an inductor, the third voltage regulator is with a coupled inductor, and inductance of the inductor is greater than inductance of the coupled inductor.

9. The device of claim 1, wherein the second power delivery channel further comprises a capacitor, a first node of the capacitor is coupled to an output terminal of the third voltage regulator, and a second node of the capacitor is coupled to a terminal that the first output signal and the converted second output signal are coupled together.

10. The device of claim 9, wherein the first power delivery channel provides DC current to the terminal while the second power delivery channel provides AC current to the terminal.

11. The device of claim 1, wherein the first input voltage is equal to the second input voltage; the first voltage regulator steps down the first input voltage to generate the first output signal, the second voltage regulator steps down the second input voltage to generate the second output signal, and the third voltage regulator steps down the second output signal to generate the converted second output signal.

12. The device of claim 1, wherein the first input voltage is lower than the second input voltage; the first voltage regulator steps down the first input voltage to generate the first output signal, the second voltage regulator steps down the second input voltage to generate the second output signal, and the third voltage regulator steps down the second output signal to generate the converted second output signal.

* * * * *